US007435925B2

(12) United States Patent
Griffin

(10) Patent No.: US 7,435,925 B2
(45) Date of Patent: Oct. 14, 2008

(54) PLASMA ARC TORCH

(75) Inventor: David C. Griffin, Florence, SC (US)

(73) Assignee: The ESAB Group, Inc., Florence, SC (US)

( * ) Notice: Subject to any disclaimer, the term of this patent is extended or adjusted under 35 U.S.C. 154(b) by 292 days.

(21) Appl. No.: 11/285,504

(22) Filed: Nov. 22, 2005

(65) Prior Publication Data

US 2006/0163219 A1 Jul. 27, 2006

Related U.S. Application Data

(63) Continuation-in-part of application No. 11/043,687, filed on Jan. 26, 2005, now Pat. No. 7,105,770.

(51) Int. Cl.
*B23K 10/00* (2006.01)

(52) U.S. Cl. .............................. 219/121.48; 219/121.5; 219/121.51; 219/121.52; 219/75; 313/231.31

(58) Field of Classification Search ............ 219/121.48, 219/121.52, 119, 74, 75, 121.51, 121.5, 121.36, 219/121.54, 121.57; 313/231.31, 231.41
See application file for complete search history.

(56) References Cited

U.S. PATENT DOCUMENTS 3,242,305 A * 3/1966 Kane et al. .................... 219/75
5,796,067 A * 8/1998 Enyedy et al. ......... 219/121.52
5,893,985 A * 4/1999 Luo et al. .............. 219/121.48
5,938,949 A 8/1999 Enyedy et al.
6,255,618 B1 7/2001 Shintani et al.
6,969,819 B1 11/2005 Griffin

* cited by examiner

*Primary Examiner*—Mark H Paschall
(74) *Attorney, Agent, or Firm*—Alston & Bird LLP

(57) ABSTRACT

A plasma torch is provided having a movable member carrying an electrode and movable along a tubular member bore having a nozzle at one end. A piston member engaged with the movable member moves the electrode between inoperable and operable positions within the bore, the movable member being biased outwardly of the one end of the bore. A first sealing member engaged with the piston member allows a fluid flow into the bore to act on the piston member to move the electrode to the operable position when the nozzle/electrode is engaged with the tubular member. A second sealing member, engaged with the bore, engages the piston member when the nozzle/electrode is removed. The fluid flow enters the bore between the sealing members, the second sealing member thus preventing torch operation when the nozzle/electrode is removed by preventing the fluid flow from acting on the piston.

13 Claims, 2 Drawing Sheets

PLASMA ARC TORCH

CROSS-REFERENCES TO RELATED APPLICATIONS

Figure 1:
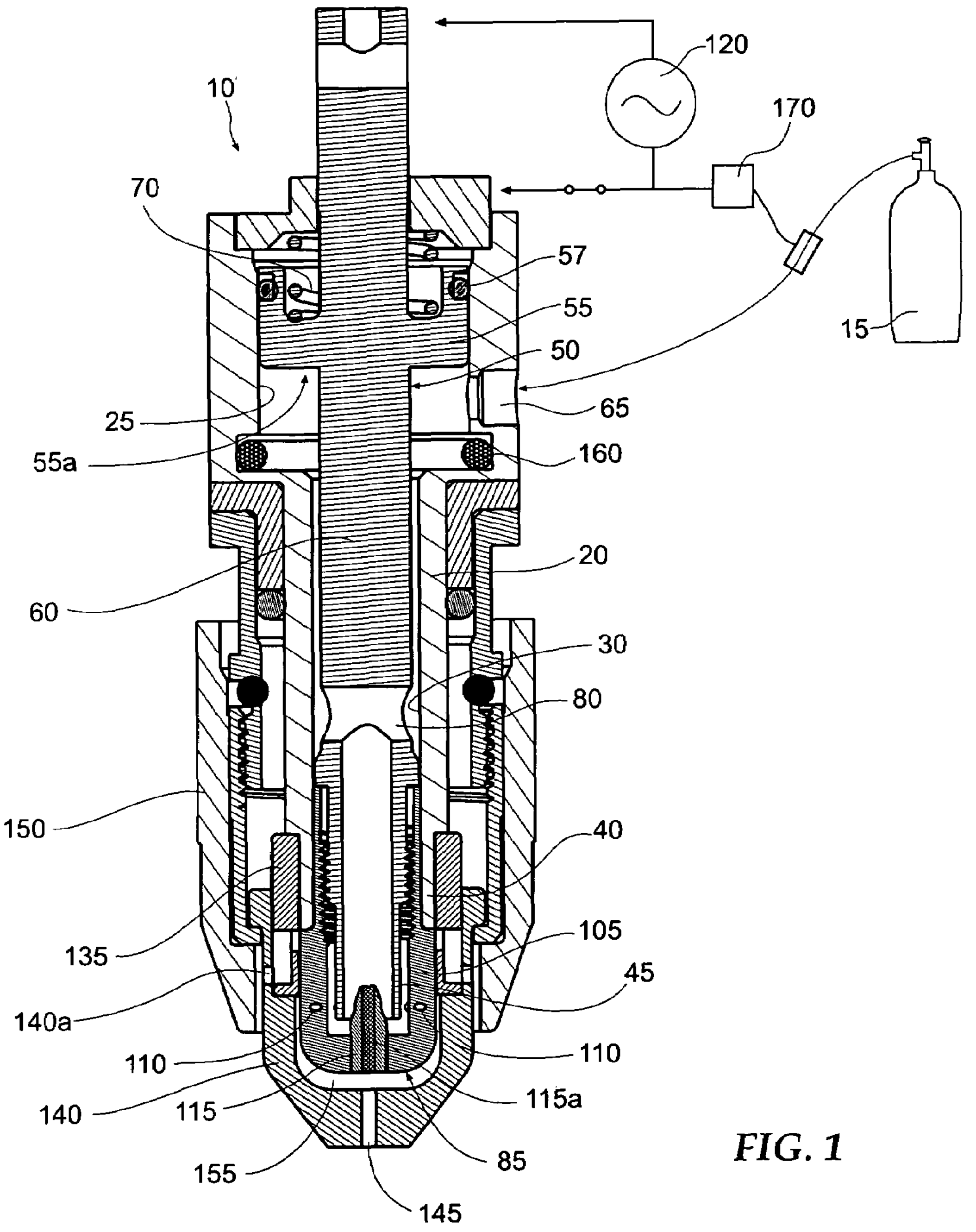

This application is a continuation-in-part of U.S. patent application Ser. No. 11/043,687, filed on Jan. 26, 2005, now U.S. Pat. No. 7,105,770 which is hereby incorporated herein in its entirety by reference.

BACKGROUND OF THE INVENTION

1. Field of the Invention

The present invention relates to a plasma arc torch and, more particularly, to a plasma arc torch with improved safety provisions.

2. Description of Related Art

Blowback type plasma torches are generally configured such that an electrode and a nozzle can be brought into contact with each other to ignite an arc, whereafter, the electrode is separated from the nozzle so as to draw the arc therebetween. A fluid, such as air, is concurrently provided under pressure through the nozzle, wherein the air flow interacts with the drawn arc so as to form a plasma. The plasma flowing through the nozzle is then directed at a workpiece to perform a cutting function.

In some instances, the fluid for forming the plasma can also be used to separate the electrode from nozzle, so as to cause the electrode to move between a torch inoperative position (in contact with the nozzle) to a torch inoperative position (separated from the nozzle to allow the arc to be drawn therebetween). That is, the formation of the plasma generally requires a limited amount of a fluid such as, for example, air. The remainder of the fluid can thus be used for other purposes, such as to separate the electrode from the nozzle and allow the arc to be drawn. Using the excess air for providing such a "blowback" operation of the electrode may provide, for example, a relatively compact size, with respect to both the components and the overall assembly, and longer service life of the torch components due to, for instance, less complex torch systems and fewer components.

However, another consideration with these torches is safety, since the torch must incorporate a power feed for providing the arc. That is, in some instances, a blowback-type plasma torch may incorporate consumables, associated with the electrode, that must be periodically replaced or otherwise maintained, wherein servicing the consumables may require disassembly (and subsequent reassembly) of the torch, possibly with hazardous exposure to the power feed. Such consumables, though, may be implemented into the torch in different ways so as to attempt to reduce the risk of accidental exposure to the power feed to the torch. For example, a torch may incorporate a set of electrical contacts in the torch head, wherein installation of a final consumable component bridges or otherwise completes a circuit and allows a signal current to flow to the electrode. This type of configuration, however, relies only on the electrical contacts in the relatively harsh environment of the head of a plasma torch, which may have a detrimental effect on the reliability of such an arrangement with respect to operation of the torch. Further, the electrical circuit may still be live in the torch during disassembly and reassembly procedures, or if the torch is incompletely or improperly reassembled, and thus this configuration may not effectively eliminate the risk of exposure to the power feed.

In another example, an electrical sensor/switch may be incorporated into the blowback-type torch to sense the position of the movable component within the torch body. Proper assembly of the consumables, in turn, moves the movable component into the torch body, thereby activating the sensor/switch and allowing current to flow to the electrode. However, this type of configuration typically requires additional wiring and/or componentry in the torch head, which may undesirably increase the size/weight of the torch. In addition, these extra components are also exposed to the harsh plasma torch environment, and thus may be detrimental to torch reliability. This configuration may also allow the electrical circuit to be live in the torch during disassembly and reassembly procedures, or if the torch is incompletely or improperly reassembled, and thus may not effectively eliminate the risk of exposure to the power feed.

Thus, there exists a need for a plasma arc torch, particularly a blowback type of plasma arc torch, having improved safety provisions, for example, by providing components configured to be formed into a torch assembly in a precise, simple, and consistent manner. Such a torch should also require complete and/or proper assembly, upon initial implementation or following required maintenance, prior to electrical and/or air service being provided thereto so as to further facilitate safety, wherein such safety provisions should not adversely affect the reliability or compactness of the torch.

BRIEF SUMMARY OF THE INVENTION

The above and other needs are met by the present invention which, in one embodiment, provides a plasma arc torch, comprising a tubular member having opposing ends and defining a bore extending axially between the ends. A nozzle is capable of being operably engaged with one end of the tubular member. A movable member has an electrode operably engaged therewith and is configured to axially and movably engage the bore of the tubular member. The movable member is further biased toward the one end of the tubular member such that the electrode contacts the nozzle when the nozzle is operably engaged with the one end of the tubular member, and such that the electrode is directed toward the one end of the tubular member and axially outward of the bore when the nozzle is not operably engaged with the one end of the tubular member. A piston member is operably engaged with the movable member, and is configured such that, when the nozzle is operably engaged with the one end of the tubular member, the piston member is capable of selectively moving the electrode, via the movable member, between a torch inoperable position where the electrode is in contact with the nozzle and a torch operable position where the electrode is separated from the nozzle within the bore. A fluid flow inlet is operably engaged with the tubular member between the ends thereof and is configured to channel a fluid flow into the bore.

A first sealing member is operably engaged with the piston member and is configured to movably seal the piston member with respect to the bore, so as to allow the fluid flow to act upon the piston member to move the electrode to the torch operable position when the nozzle is operably engaged with the one end of the tubular member. A second sealing member is operably engaged with the bore and is configured to engage the piston member when the nozzle is not operably engaged with the one end of the tubular member, and the electrode is directed toward the one end of the tubular member and axially outward of the bore. The second sealing member is operably engaged with the bore such that the fluid flow inlet is disposed between the first and second sealing members. Such a configuration thereby prevents operation of the torch when the nozzle or electrode is not properly assembled therewith by preventing the fluid flow from acting upon the piston member to move the electrode to the torch operable position.

Embodiments of the present invention thus provide a blowback type of plasma arc torch having improved safety features, for example, by providing components configured to be formed into a torch assembly in a precise and consistent manner, whereby proper and complete assembly or reassembly of the torch may be readily assured and/or may be required before the torch can be operated. These and other significant advantages are provided by embodiments of the present invention, as described further herein.

BRIEF DESCRIPTION OF THE SEVERAL VIEWS OF THE DRAWING(S)

Figure 2:
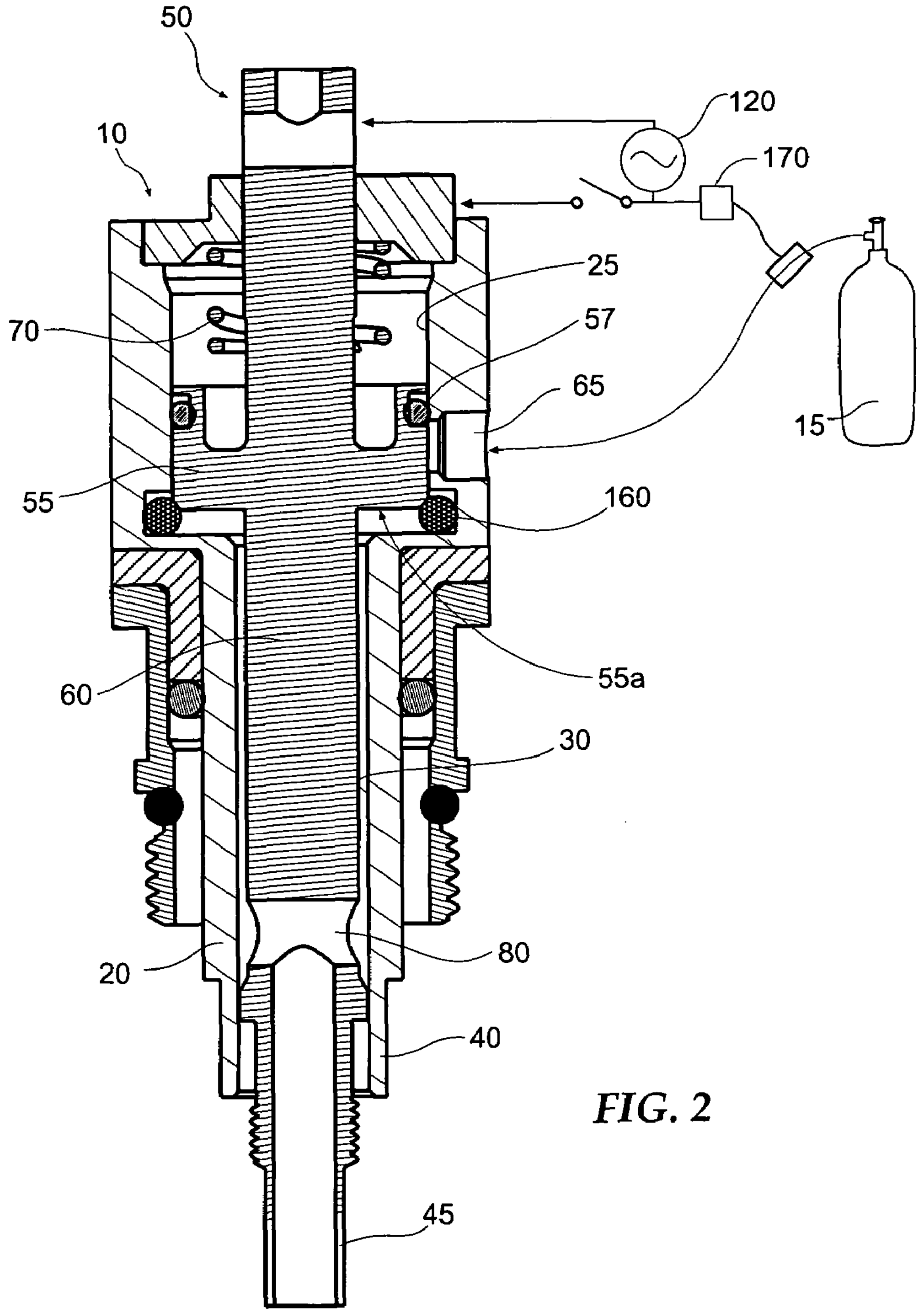

Having thus described the invention in general terms, reference will now be made to the accompanying drawings, which are not necessarily drawn to scale, and wherein:

FIG. 1 is a schematic of a plasma arc torch according to one embodiment of the present invention illustrating an assembled torch, wherein the electrode is movable between a torch inoperative position and a torch operative position by a fluid flow acting on a piston member operably engaged with the electrode; and FIG. 2 is a schematic of a plasma arc torch according to one embodiment of the present invention, as shown in FIG. 1, illustrating a disassembled torch, wherein a sealing member prevents the fluid flow from acting on the piston member when the torch is disassembled and thus prevents the electrode from being moved to the torch operative position.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates a plasma arc torch according to one embodiment of the present invention, the torch being shown in an assembled condition and being indicated generally by the numeral 10. Such a torch 10 may be, for example, a blowback or touch-start type torch incorporating improved safety provisions. As shown, the torch 10 includes a tubular member or housing 20 defining a bore comprising, for example, axial piston bore 25 extending to a smaller axial shaft bore 30 along an axis. The shaft bore 30 ends at one end 40 of the tubular member 20, wherein the end 40 is disposed opposite the shaft bore 30 from the piston bore 25. The tubular member 20 further includes a fluid flow inlet 65 in fluid communication with the bore.

A movable member 50 includes a piston portion 55 having a shaft portion 60 engaged therewith and extending axially therefrom. The movable member 50 is configured to be received within the tubular member 20 such that the piston portion 55 is axially movable within the piston bore 25 and the shaft portion 60 is axially movable within the shaft bore 30. The movable member 50 is normally biased toward the shaft bore 30 by, for example, a biasing member 70 acting against the piston portion 55, though one skilled in the art will appreciate that the movable member 50 may be biased toward the end 40 of the tubular member 20 in many different manners. The piston portion 55 also includes, for example, a first sealing member 57, such as an O-ring, extending around the circumference thereof so as to form a movable seal with the inner surface of the portion of the tubular member 20 defining the piston bore 25. One skilled in the art will appreciate, however, that the piston portion 55 may be movably sealed with respect to the piston bore 25 in many different manners consistent with the spirit and scope of the present invention. For example, the first sealing member may, in some instances, be integral with the piston portion 55.

The shaft bore 30 is generally configured to be closely toleranced with respect to the outer dimensions of the shaft portion 60 of the movable member 50, but with sufficient clearance to allow the shaft portion 60 to move axially therethrough. A pressurized fluid such as, for example, air, from a fluid source 15 introduced through the fluid flow inlet 65 into the bore cannot escape axially past the first sealing ring 57 surrounding the piston portion 55 within the piston bore 25 and will thus flow axially between the shaft portion 60 and shaft bore 30, and/or through the shaft portion 60 itself, toward the end surface 40 of the tubular member 20. In the configuration shown in FIG. 1, at least a portion of the shaft portion 60 is configured to be hollow, with the air entering the shaft portion 60 through one or more holes 80 extending through the movable member 50 into the shaft portion 60, distally with respect to the piston portion 55. Preferably, in this configuration, little or no air flows between the shaft portion 60 and the shaft bore 30 along the portion of the shaft portion 60 between the holes 80 and the distal end 45 of the shaft portion 60.

The distal end 45 of the shaft portion 60 is configured to receive an electrode assembly 85, comprising an electrode member 105 and a consumable element **115*a* engaged therewith so as to be disposed in axial correspondence with the shaft portion 60, wherein the electrode member 105 is configured to engage the exterior portion of the hollow shaft portion 60 through, for example, a threaded engagement therebetween. The electrode member 105 defines one or more laterally-extending holes 110 disposed axially between the shaft portion 60 and the consumable element 115*a*. In such a configuration, the shaft member 60 channels the air toward the consumable element 115*a*, wherein, after flowing across the consumable element 115*a* to provide cooling therefor, the air is directed through the holes 110 to the exterior of the electrode member 105**.

As previously discussed, the electrode member 105 is configured to receive a consumable element **115*a* disposed in axial correspondence with the shaft portion 60 and received, for example, in a friction fit, directly therebetween. In other instances, the consumable element 115*a* may be received by a holder member 115 which, in turn, is then received by the electrode member 105. Accordingly, the electrode assembly 85 may be formed as a "one-piece" assembly, having either the consumable element 115*a* or consumable element 115*a*/holder member 115 arrangement in a friction fit or a press fit therewith or, in other instances, the consumable element 115*a* or consumable element 115*a*/holder member 115 arrangement may be configured to be removable from the electrode member 105 (and thus replaceable independently of the electrode member 105). Preferably, the consumable element 115*a* is configured to facilitate formation of the plasma, wherein such a consumable element 115*a* may be formed of any suitable material such as, for example, hafnium. Further, as shown, the consumable element 115*a* or consumable element 115*a*/holder member 115 arrangement may further be configured such that the portion thereof extending toward the shaft portion 60 may be tapered so as to, for example, facilitate cooling of the consumable element 115*a* or consumable element 115*a*/holder member 115 arrangement, and/or direct the air flow radially outward with respect to the electrode member 105 to facilitate the flow of the air through the holes 110 defined by the electrode member 105**.

The one end 40 of the tubular member 20 may, in some instances, be configured to receive an axial spacer 135. The axial spacer 135, in turn, is configured to receive a nozzle 140 such that the axial spacer 135 is disposed between the one end 40 and the nozzle 140, to provide appropriate spacing for accommodating the travel of the electrode assembly 85, while constraining the electrode assembly 85 within the torch 10. In some instances, the nozzle 140 and/or the one end 40 of the tubular member 20 may be configured to incorporate the structure of the axial spacer 135 such that the axial spacer 135 becomes unnecessary. The axial spacer 135, or an axial spacer 135/nozzle 140 integral assembly, may be configured, or example, to threadedly engage the one end 40 of the tubular member 20, whereby such a threaded engagement may allow the nozzle 140 to be adjustable so as to accommodate an electrode assembly 85 having a different length. In some instances, a shield cup 150 is configured to extend over the nozzle 140 and to interact with the tubular member 20 so as to, for example, secure the nozzle 140 to the one end 40 of the tubular member 20 or channel any air flowing through lateral holes 140*a* defined by the nozzle 140, about the nozzle 140, to promote cooling of the nozzle 140. Further, in some instances, the nozzle 140 may also be configured to extend axially through the shield cup 150, with the nozzle 140 having a retaining flange for interacting with the shield cup 150 in order to retain and secure the nozzle 140. One skilled in the art will appreciate, however, that there may be many different configurations of the components involved in securing the nozzle 140 with respect to the one end 40 of the tubular member 20. For example, the shield cup 150 and the nozzle 140 may be an integral assembly. Accordingly, the configurations provided herein are for example only and are not intended to be limiting in this respect.

The nozzle 140 defines an axial nozzle bore 145 (through which the plasma is emitted) and is configured to generally surround the electrode assembly 85. The nozzle 140, the axial spacer 135 (if used), and the one end 40 of the tubular member 20 thus cooperate to form the plasma chamber 155 in the torch 10. The electrode assembly 85 is axially movable within the plasma chamber 155 between an inoperative position (not shown) where the electrode member 105 and/or the consumable element 115*a* (and/or the holder member 115, as applicable) contacts the inner surface of the nozzle 140, and an operative position (as shown in FIG. 1) where the electrode assembly 85 is retracted into the tubular member 20 via the pressurized air acting on the piston portion 55 against the force of the biasing member 70. The electrode assembly 85 is capable of sufficient axial travel such that, in the operative position, the electrode member 105/consumable element 115*a* is separated from the inner surface of the nozzle 140 by a sufficient distance to allow the arc to be drawn. The operative position of the electrode assembly 85 may be determined, for example, by the air pressure or flow, by the travel of the movable member 50, or by the characteristics of the biasing member 70. In one embodiment, the operative position of the electrode assembly 85 is determined by the limitation of the axial travel of the electrode member 105 by the one end 40 of the tubular member 20 (i.e., the operative position of the electrode assembly 85 occurs when the electrode member 105 contacts the one end 40 of the tubular member 20 and stops the axial travel of the electrode assembly 85).

In general, a blowback torch of the type described first requires the application of a voltage between the consumable element 115*a*/electrode member 105 and the nozzle 140, with the electrode assembly 85 in the inoperative position. Subsequently, the pressurized air is introduced through the fluid flow inlet 65 with sufficient pressure to act on the transverse surface 55*a* of the piston portion 55 of the movable member 50 disposed toward the shaft bore 30, against the force of the biasing member 70, so as to force the movable member 50, and thus the electrode assembly 85, away from the nozzle 140. The pressurized air acting on the transverse surface 55*a* of the piston portion 55 thus provides the "blowback" and moves the electrode assembly 85 to the operative position, whereby separation of the consumable element 115*a*/electrode member 105 from the nozzle 140 draws the arc therebetween. At the same time, the air flowing through the one or more holes 110 defined by the electrode member 105, via the interior of the shaft portion 60 and the holes 80 therein, enters the interior of the nozzle 140, wherein a portion of the air is directed to the plasma chamber 155 to form the plasma, which exits the plasma chamber 155 through the nozzle bore 145 so as to allow the operator to cut a workpiece. Another portion of the pressurized air flows through the lateral holes 140*a* defined by the nozzle 140 and, once outside the nozzle 140, may be directed by the shield cup 150 to flow about the exterior of the nozzle 140 so as to provide, for example, cooling of the nozzle 140.

In some instances, certain torch components may require periodic servicing and/or replacement. For example, the consumable element 115*a* and/or the electrode member 105 may experience wear during service and need to be replaced, thereby requiring disassembly of the shield cup 150 and/or the nozzle 140 from the torch 10 so as to provide the necessary access to those components. Accordingly, as shown in FIG. 2, the shield cup 150 and the nozzle 140 are removed, followed by the electrode assembly 85 comprising the consumable element 115*a*/electrode member 105. Since the movable member 50 is no longer restrained in the torch 10 by the removed components, the biasing member 70 biases the shaft portion 60 axially outward of the one end 40 of the tubular member 20. Since at least a portion of the electrical power or a signal current delivered to the torch head, from an electrical source 120 remotely disposed with respect to the torch head, is directed through the shaft portion 60 (to form the portion of the electrical circuit between the electrode assembly 85 and the nozzle 140 necessary for torch operation), leaving the shaft portion 60 exposed creates a shock hazard. As such, embodiments of the present invention incorporate a second sealing member 160, such as, for example, an O-ring, operably engaged with the bore of the tubular member 20, for engaging the piston portion 55, when the consumable element 115*a* and/or the electrode member 105 are removed from the torch 10, so as to prevent the air provided through the fluid flow inlet 65 from reaching and acting on the transverse surface 55*a* of the piston portion 55.

For example, the second sealing member 160 may be disposed at the end of the piston bore 25, adjacent to the shaft bore 30, and is configured to extend radially-inward at least partially into the piston bore 25. In this manner, when the shield cup 150, the nozzle 140, and/or the electrode assembly 85 are removed, the biasing member 70 biases the movable member 50 axially outward of the one end 40 of the tubular member 20. The transverse surface 55*a* of the piston portion 55 of the movable member 50, thus biased toward the end of the piston bore 25 adjacent to the shaft bore 30, engages with the second sealing member 160, extending into the piston bore 25, to form a sealing engagement. In one embodiment, the second sealing member 160 is configured to sealingly engage the transverse surface 55*a* of the piston portion 55, about the outer circumference thereof, when the shield cup 150, the nozzle 140, and/or the electrode assembly 85 are removed. In such an embodiment, the fluid flow inlet 65 is configured to be in fluid communication with the piston bore 25 opposite the second sealing member 160 from the shaft bore 30. Further, the fluid flow inlet 65 is also configured to be disposed so as to communicate with the bore between the second sealing member 160 and the first sealing member 57, when the transverse surface 55*a* of the piston portion 55 is in sealing engagement with the second sealing member 160. In this manner, when the shield cup 150, the nozzle 140, and/or the electrode assembly 85 are removed, any fluid (air) entering the bore through the fluid flow inlet 65 is prevented from acting on the transverse surface 55*a* of the piston portion 55 disposed toward the shaft bore 30. As such, without the fluid flow acting on the transverse surface 55*a* of the piston portion 55, the movable member 50 then cannot be moved axially inward from the one end 40 of the tubular member 20 by the fluid flow. One purpose of such as configuration is discussed below.

In other instances, the second sealing member 160 may be integral with the bore of the tubular member 20 and/or the movable member 50, or engaged with the movable member 50 (instead of the bore of the tubular member 20). For example, the bore of the tubular member 20, particularly the piston bore 25 at or about the transition to the shaft bore 30, may be provided with a second sealing member 160 comprising a flange corresponding to and in close tolerance with all or a portion of the transverse surface 55*a* of the piston portion 55, whereby the force of the biasing member 70 may be sufficient to form and maintain the sealing engagement between the flange and the piston portion 55. As shown, the second sealing member 160/sealing engagement between the second sealing member 160 and the piston portion 55 is axially disposed opposite the fluid flow inlet 65 from the first sealing member 57, though other configurations may also be implemented with the spirit and scope of the present invention. In some instances, the second sealing member 160/sealing engagement between the sealing member 160 and the piston portion 55 may also serve to limit the travel of the shaft portion 60 axially outward of the tubular member 20.

The torch 10 also includes a fluid flow controller 170 in communication with the fluid source 15 and configured to monitor the flow of the fluid (air) from the fluid source 15 to the torch 10. The fluid flow controller 170 is also configured to be in communication with the electrical source 120. Accordingly, when the consumable element 115*a* and/or the electrode member 105 are removed from the torch 10 and the second sealing member 160 forms the sealing engagement with the transverse surface 55*a* of the piston portion 55, the fluid flow controller 170 is configured to sense that the fluid flow from the fluid source 15 is being prevented from reaching the transverse surface 55*a* of the piston member 55, as well as the shaft portion 60, and thus, in turn, is configured to prevent electrical power from the electrical source 120 from reaching the shaft portion 60 through, for example, a switching function. The severance of the electrical power from the electrical source 120 to the shaft portion 60 by the fluid flow controller 170 (which may comprise, for example, a monitorable flow switch or other appropriate device) in the absence of fluid flow from the fluid source 15 to the transverse surface 55*a* of the piston member 55 thus minimizes or prevents any risk of electrical shock when the consumable element 115*a* and/or the electrode member 105 are removed from the torch 10.

Upon reassembly of the torch 10 and restoration of the air flow to the transverse surface 55*a* of the piston member 55 and shaft portion 60 (i.e., no sealing engagement between the second sealing member 160 and the piston portion 55), the fluid flow controller 170 may be further configured to assure that a certain air flow from the fluid source 15 has been attained prior to restoring electrical power from the electrical source 120 to the electrode assembly 85. For example, the fluid flow controller 170 may be configured to have a time delay following restoration of the air flow, or may be configured to require that a certain flow rate be attained, prior to restoring the electrical power, thereby adding an additional safety measure to a blowback-type torch 10 according to embodiments of the present invention. Incorporating the fluid flow controller 170 externally to the torch 10 such as, for example, in conjunction with the electrical source 120 and/or the fluid source 15 and remotely with respect to the torch 10, also advantageously results in a more compact torch 10, since wiring and/or other hardware requirements for the fluid flow controller 170 are also external to the torch 10. In addition, since fewer components are exposed to the harsh environment of the torch head, improved torch reliability may also be obtained.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A plasma arc torch, comprising:

a tubular member having opposing ends and defining a bore extending axially between the ends;

a nozzle capable of being operably engaged with one end of the tubular member;

a movable member having an electrode operably engaged therewith and being configured to axially and moveably engage the bore of the tubular member, the moveable member further being biased toward the one end of the tubular member such that the electrode contacts the nozzle when the nozzle is operably engaged with the one end of the tubular member, and such that the electrode is directed toward the one end of the tubular member and axially outward of the bore when the nozzle is not operably engaged with the one end of the tubular member;

a piston member operably engaged with the movable member, the piston member being configured such that, when the nozzle is operably engaged with the one end of the tubular member, the piston member is capable of selectively moving the electrode, via the movable member, between a torch inoperable position where the electrode is in contact with the nozzle and a torch operable position where the electrode is separated from the nozzle within the bore;

a fluid flow inlet operably engaged with the tubular member between the ends thereof and configured to channel a fluid flow into the bore;

a first sealing member operably engaged with the piston member and configured to movably seal the piston member with respect to the bore so as to allow the fluid flow to act upon the piston member to move the electrode to the torch operable position when the nozzle is operably engaged with the one end of the tubular member; and a second sealing member operably engaged with the bore and configured to engage the piston member when the nozzle is not operably engaged with the one end of the tubular member and the electrode is directed toward the one end of the tubular member and axially outward of the bore, the second sealing member being operably engaged with the bore such that the fluid flow inlet is disposed between the first and second sealing members, thereby preventing operation of the torch when at least one of the nozzle and the electrode is not properly assembled therewith by preventing the fluid flow from acting upon the piston member to move the electrode to the torch operable position.

2. A plasma arc torch according to claim 1 wherein the electrode extends outwardly from the one end of the movable member toward the nozzle, and defines a bore configured to receive a consumable element therein.

3. A plasma arc torch according to claim 1 further comprising a fluid source in communication with the fluid flow inlet and configured to provide the fluid flow thereto.

4. A plasma arc torch according to claim 1 further comprising a biasing member operably engaged between the tubular member and the movable member, the biasing member being configured to normally axially bias the movable member toward the one end of the tubular member.

5. A plasma arc torch according to claim 1 wherein the first sealing member is operably engaged with the piston member so as to be fluidly disposed opposite the fluid flow inlet from the one end of the tubular member.

6. A plasma arc torch according to claim 1 wherein the second sealing member is configured to sealingly engage the bore of the tubular member, fluidly between the fluid flow inlet and the one end of the tubular member.

7. A plasma arc torch according to claim 1 wherein the first sealing member is configured to be integral with the piston member.

8. A plasma arc torch according to claim 1 wherein the second sealing member is configured to be integral with the bore of the tubular member.

9. A plasma arc torch according to claim 1 wherein the first sealing member further comprises an O-ring operably engaged with the piston member.

10. A plasma arc torch according to claim 1 wherein the second sealing member further comprises an O-ring operably engaged with the bore of the tubular member.

11. A plasma arc torch according to claim 1 further comprising a fluid flow controller operably engaged with a fluid source so as to be in communication with the fluid flow, the fluid flow controller being configured to determine whether the fluid flow is acting upon the piston member.

12. A plasma arc torch according to claim 11 further comprising an electrical source in communication with the electrode and configured to provide an electrical current thereto, the fluid flow controller being further configured to prevent the electrical current from reaching the electrode if the fluid flow is not acting upon the piston member.

13. A plasma arc torch according to claim 11 wherein the fluid flow controller further comprises a monitorable flow switch.

* * * * *